US012113316B2

(12) United States Patent
Strother

(10) Patent No.: US 12,113,316 B2

(45) Date of Patent: Oct. 8, 2024

(54) GROUNDING ASSEMBLIES FOR AN ELEVATOR ASSEMBLY

(71) Applicant: TK Elevator Innovation and Operations GmbH, Düsseldorf (DE)

(72) Inventor: Jordan Strother, Marietta, GA (US)

(73) Assignee: TK ELEVATOR INNOVATION AND OPERATIONS GMBH, Düsseldorf (DE)

(*) Notice: Subject to any disclaimer, the term of this patent is extended or adjusted under 35 U.S.C. 154(b) by 394 days.

(21) Appl. No.: 17/568,939

(22) Filed: Jan. 5, 2022

(65) Prior Publication Data

US 2023/0216250 A1 Jul. 6, 2023

(51) Int. Cl.

| | |
|---|---|
| ***H01R 13/652*** | (2006.01) |
| ***B66B 5/00*** | (2006.01) |
| ***B66B 5/02*** | (2006.01) |
| ***B66B 11/00*** | (2006.01) |

(52) U.S. Cl.

CPC ......... *H01R 13/652* (2013.01); *B66B 5/0018* (2013.01); *B66B 5/02* (2013.01); *B66B 11/0005* (2013.01)

(58) Field of Classification Search

USPC ................ 310/248, 249, 239, 244, 245, 246

See application file for complete search history.

(56) References Cited

U.S. PATENT DOCUMENTS

| | | | | |
|---|---|---|---|---|
| 747,890 A * | 12/1903 | McElroy | H01R 39/381 | 310/346 |
| 3,668,451 A * | 6/1972 | McNab | H01R 39/24 | 310/248 |
| 4,287,551 A * | 9/1981 | Watanabe | H02K 11/33 | 307/145 |

OTHER PUBLICATIONS

Electric slip rings: 5 things to know about brushes, voltage drops, and noise mitigation, https://www.motioncontroltips.com/electric-slip-rings-5-things-to-know-about-brushes-voltage-drops-and-noise-mitigation, pp. 1-15.

Shaft Grounding Devices, https://www.emersonbearing.com/shaft-grounding-devices, pp. 1-8.

AEGIS® Comparison vs. Discrete-Point Brushes, https://nanopdf.com/download/aegis-comparison-vs-discrete-point-brushes_pdf, pp. 1-2.

Kinetronics StaticWisk Anti-Static Brush, 25"—SWG-625, https://www.penntoolco.com/kinetronics-staticwisk-anti-static-brush-25-swg-625/?gclid=Cj0KCQiAkZKNBhDiARIsAPsk0WiiOL39UawOgbW9A1FKVwgryCvtFN7DBhUGoQS2EfHZBFV1gFuc-C8aAtPnEALw_wcB, pp. 1-4.

(Continued)

*Primary Examiner* — Ross N Gushi

(74) *Attorney, Agent, or Firm* — Dinsmore & Shohl LLP

(57) ABSTRACT

Embodiments herein are directed to an electrical assembly for grounding an elevator assembly, the elevator assembly having an elevator cab, a grounded elevator frame, a sheave, and a suspension member having conductive members and a sleeve enclosing the conductive members. The suspension member extends around the sheave to support the elevator cab. The electrical assembly includes a bracket and a grounding member. The grounding member is electrically coupled to the sheave such that contact with the sheave forms an electrical ground path between the sheave through the grounding member and the bracket, and into the grounded elevator frame. When the sheave rotates the suspension member, any portion of the conductive members from the suspension member making contact with the sheave grounds the sheave to the grounded elevator frame via the electrical ground path.

17 Claims, 5 Drawing Sheets

(56) References Cited

OTHER PUBLICATIONS

Escalator Mechanical Parts Anti-Static Brush Supplier, OTIS Sidewalk Safety Brush for Voltage Discharge EEV241A1, https://www.elevatorvip.com/product/escalator-mechanical-parts-electrostatic-brush-eev241a1, pp. 1-6.
Escalator Handrail Static Discharge Rollers, https://konespares.com/escalator-parts/escalator-handrail-static-discharge-rollers, pp. 1-5.

* cited by examiner

GROUNDING ASSEMBLIES FOR AN ELEVATOR ASSEMBLY

TECHNICAL FIELD

The present specification generally relates to a grounding device and, more specifically, to a grounding device for creating an electrical ground path between a sheave and a grounded elevator frame.

BACKGROUND

It is known to use a plurality of suspension members, such as hoisting belts, or hoisting ropes, attached to an elevator cab of an elevator system to move the elevator cab between floors of a building within an elevator shaft or hoistway. The suspension members from which the elevator cab is suspended typically include a plurality of tensile load bearing conductive members that are traditionally formed of metal and are encased in a non-conductive outer jacket or sleeve to prevent contact between the conductive members and a sheave, such as a traction type sheave or an idler type sheave, of the elevator system as the suspension members pass over the traction sheave. The outer jacket or sleeve of the suspension members may become worn over time, such that the conductive members can become exposed through a break or worn spot in a sidewall of the outer jacket or sleeve, or otherwise extend through the sleeve. The contact between the conductive members and the traction sheave increases the wear on the conductive members, which may affect traction between the sheave and the suspension members.

Accordingly, a need exists for elevator grounding assemblies for detecting when the conductive members of elevator suspension members are exposed.

SUMMARY

An electrical assembly for grounding an elevator assembly, the elevator assembly having an elevator cab, a grounded elevator frame, at least one sheave, and at least one suspension member having one or more conductive members and a sleeve enclosing the one or more conductive members, the at least one suspension member extending around the at least one sheave to support the elevator cab. The electrical assembly includes a bracket coupled to the grounded elevator frame, and a grounding member coupled to the bracket. The grounding member is electrically coupled to the at least one sheave such that contact with the at least one sheave forms an electrical ground path between the least one sheave through the grounding member and the bracket, and into the grounded elevator frame. When the at least one sheave rotates the at least one suspension member, any portion of the one or more conductive members from the at least one suspension member making contact with the at least one sheave grounds the at least one sheave to the grounded elevator frame via the electrical ground path.

An electrical assembly for grounding an elevator assembly, the elevator assembly having an elevator cab, a grounded fixed member, at least one sheave, and at least one suspension member having one or more conductive members and a sleeve enclosing the one or more conductive members, the at least one suspension member extending around the at least one sheave to support the elevator cab. The electrical assembly includes a bracket having a first end portion and a second end portion positioned opposite of the first end portion, the second end portion is coupled to the grounded fixed member, a housing coupled to the first end portion of the bracket, the housing having a slot, and a grounding member coupled to the housing and positioned within the slot. The grounding member is electrically coupled to the at least one sheave such that contact with the at least one sheave forms an electrical ground path between the at least one sheave through the grounding member and the bracket, and into the grounded fixed member such that when the at least one sheave rotates the at least one suspension member, any portion of the one or more conductive members from the at least one suspension member making contact with the at least one sheave grounds the at least one sheave to the grounded fixed member via the electrical ground path.

An electrical assembly for grounding an elevator assembly, the elevator assembly having an elevator cab, a grounded elevator frame, at least one sheave, and at least one suspension member having one or more conductive members and a sleeve enclosing the one or more conductive members, the at least one suspension member extending around the at least one sheave to support the elevator cab. The electrical assembly includes a bracket, a housing having a slot, and a grounding member coupled to the housing and positioned within the slot. The bracket includes a first member and a second member pivotally coupled to the first member by a biasing member positioned between the first member and the second member. The biasing member biases the first member in a direction towards the at least one sheave. The second member is coupled to the grounded elevator frame. The housing is coupled to the first member of the bracket. The grounding member is electrically coupled to the at least one sheave such that contact with the at least one sheave forms an electrical ground path between the at least one sheave through the grounding member and the bracket, and into the grounded elevator frame such that when the at least one sheave rotates the at least one suspension member, any portion of the one or more conductive members from the at least one suspension member making contact with the at least one sheave grounds the at least one sheave to the grounded elevator frame via the electrical ground path.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to an elevator assembly that includes an elevator grounding assembly for detecting when the conductive members suspension members' internal tensile are exposed through a break in an outer jacket or sleeve of the suspension member by grounding various sheaves within an elevator hoistway. For example, both idler type sheaves and traction type sheaves may be grounded. The conductive members may be provided in a sleeve that, when undamaged or unworn, prevents direct contact between the conductive members and the various sheaves of the elevator assembly. As the sheave is rotated, the movement of the suspension members around the sheave and the resulting contact between the sleeve and the sheave may wear down the sleeve, such that at least one of the conductive members may become exposed to the sheave. Direct contact between the conductive members and the sheave may increase the wear on the conductive members and the sleeve and cause damage to the conductive members. The increased wear provides for undesirable condition for the suspension members.

The elevator grounding assembly may include a grounding device coupled to an elevator frame and extending into contact with the sheave indented to be grounded to the elevator frame. The grounding device creates an electrical ground path between the sheave and the elevator frame, which is grounded, such as to an earth ground. The elevator grounding assembly may further include a plurality of sensors and a monitoring system that provides a small voltage to different pairs of conductive members via the plurality of sensors, and monitors, for example, a resistance of the conductive members between the loop formed by the pair of conductive members and sensors.

When a conductive member becomes exposed through a break in the sleeve of the suspension member, the conductive member may contact the traction sheave. The contact between the conductive member and the traction sheave grounds the conductive member via the grounding device, thereby changing the monitored resistance. The change in resistance is indicative of at least one conductive member exposed through the sleeve.

Figure 1A:
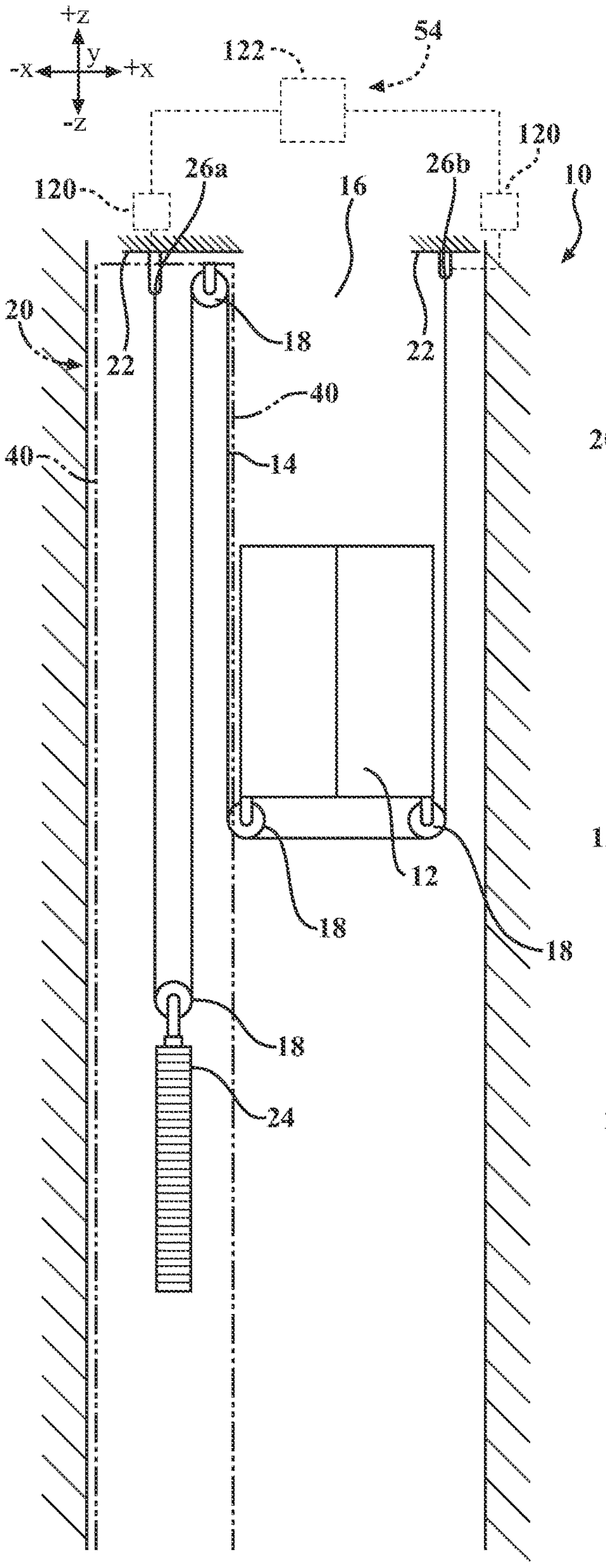
FIG. 1A schematically depicts a first aspect of an example elevator assembly schematic, according to one or more embodiments shown and described herein.

As used herein, the term "longitudinal direction" refers to the forward-rearward direction of the elevator assembly (i.e., in a +/−Y direction of the coordinate axes depicted in FIG. 1A). The term "lateral direction" refers to the cross-direction (i.e., along the X axis of the coordinate axes depicted in FIG. 1A), and is transverse to the longitudinal direction. The term "vertical direction" refers to the upward-downward direction of the elevator assembly (i.e., in the +/−Z direction of the coordinate axes depicted in FIG. 1A). As used herein, "upper" is defined as generally being towards the positive Z direction of the coordinate axes shown in the drawings. "Lower" is defined as generally being towards the negative Z direction of the coordinate axes shown in the drawings.

As used herein, the term "communicatively coupled" means that coupled components are capable of exchanging data signals and/or electric signals with one another such as, for example, electrical signals via conductive medium, electromagnetic signals via air, optical signals via optical waveguides, electrical energy via conductive medium or a non-conductive medium, data signals wirelessly and/or via conductive medium or a non-conductive medium and the like.

Referring now to FIG. 1A, an elevator assembly 10 schematic that illustrates various components for a first aspect of an example elevator assembly 10 is depicted. In this aspect, the example elevator assembly 10 may include an elevator cab 12, a plurality of suspension members 14 illustrated for schematic reasons as a single suspension member, a hoistway 16 or elevator shaft, a plurality of sheaves 18, an example grounded frame 20, and a plurality of weights 24 that act as a counterweight to the elevator cab 12. The plurality of weights 24 move within the example frame 20 in the system vertical direction (i.e., in the +/−Z direction). The example frame 20 may be an elevator frame, a counterweight elevator frame, and/or the like, as discussed in greater detail herein. The plurality of suspension members 14 include a distal end 26*a* and a proximate end 26*b*.

Further, in this aspect, as illustrated and without limitation, the example frame 20 includes two sheaves of the plurality of sheaves 18. For example, one sheave is fixedly mounted to an upper portion the example frame 20 positioned in an upper portion of the hoistway 16 above the elevator cab 12 in a vertical direction (i.e., in the +/−Z direction) and another sheave moves with the weights 24 as the elevator cab 12 moves between various landings. This is non-limiting, and any number of the plurality of sheaves 18 may be mounted anywhere within the hoistway 16 and there may be more than or less than the two sheaves illustrated as being in the example frame 20.

At least one of the plurality of sheaves 18 within the hoistway 16 may include a motor such that the sheave is a traction sheave capable of driving the plurality of suspension members 14 through a plurality of lengths between the elevator cab 12 and the traction sheave. Further, the plurality of sheaves 18 may further include a plurality of idler sheaves that may also be mounted at various positions in the hoistway 16, and, in this aspect, are also coupled to the elevator cab 12. Idler sheaves are passive (they do not drive the plurality of suspension members 14 but rather guide or route the plurality of suspension members 14) and form a contact point, or engagement point, with the elevator cab 12. The plurality of suspension members 14 and the plurality of sheaves 18 move the elevator cab 12 between a plurality of positions within the hoistway 16 including to a plurality of landings. The plurality of sheaves 18 may include any combination of traction type sheaves and idler type sheaves.

As illustrated in FIG. 1A, the elevator assembly 10 is an underslung system, with the idler sheaves positioned on a bottom surface of the elevator cab 12. Each of the plurality of suspension members 14 may be movably coupled to the traction sheave and a portion of the suspension members 14 may be coupled to the bottom surface of the elevator cab 12 to suspend the elevator cab 12 via the idler sheaves. As such, the suspension members 14 pass under the elevator cab 12 on a bottom of the elevator cab 12 via the idler sheaves, and are coupled at the top of the hoistway 16 under tension to various structures, such as to the example frame 20, a plurality of rail caps 22, and/or the like. For example, the proximate end 26*b* of the suspension members 14 may be fixedly coupled to the rail caps 22 and the movably coupled portion of the suspension members 14 are under tension to move the elevator cab 12 between various landings. The example frame 20 may include a dead end hitch, at least one of the plurality of rail caps 22, or other structural components.

Figure 1B:
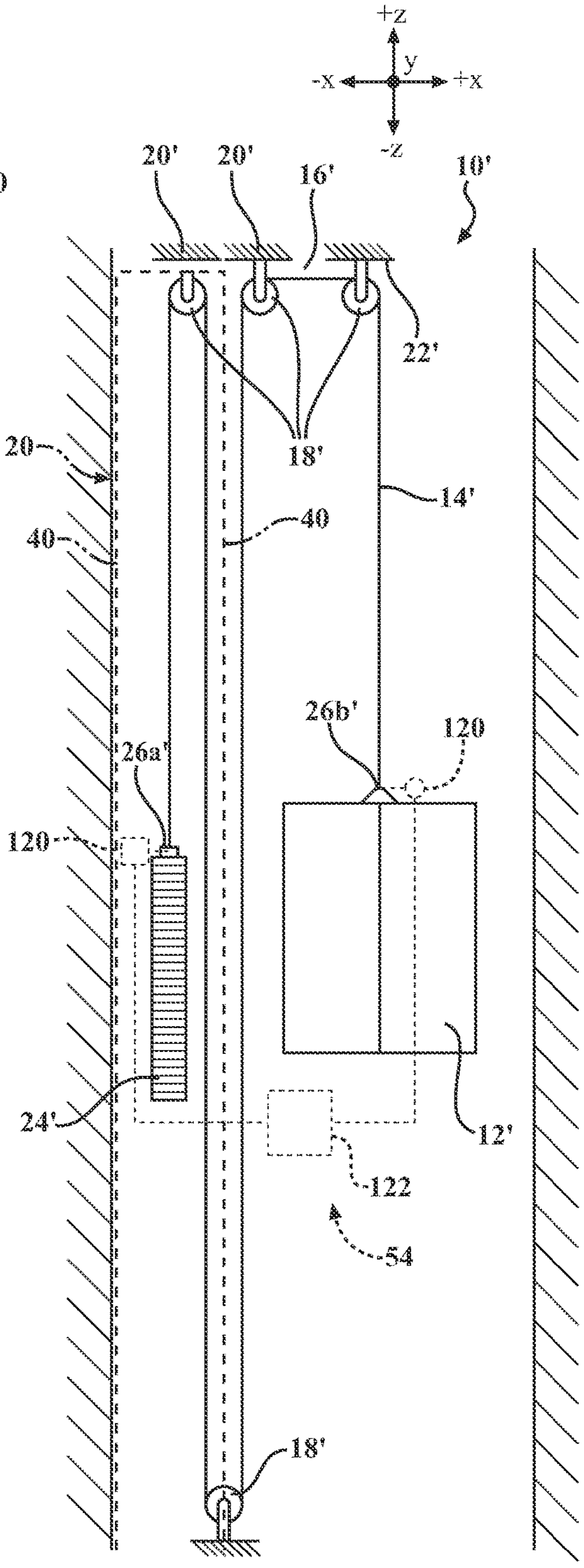
FIG. 1B schematically depicts a second aspect of an example elevator assembly schematic, according to one or more embodiments shown and described herein.

Referring now to FIG. 1B, a schematic illustrates various components for a second aspect of an example elevator assembly 10' is depicted. It should be appreciated that the in the discussion herein, the elevator assembly 10 may refer to either elevator assembly 10, 10'. In this aspect, the elevator assembly 10' may include an elevator cab 12', a plurality of suspension members 14' illustrated for schematic reasons as a single suspension member, a hoistway 16' or elevator shaft, a plurality of sheaves 18', such as traction sheaves and/or idler sheaves, an example grounded frame 20', and a plurality of weights 24' that move within the example frame 20' in the system vertical direction (i.e., in the +/−Z direction). In this aspect, the plurality of suspension members 14' extend a length between the weights 24' and the elevator cab 12'. Further, in this aspect, at least one of the plurality of sheaves 18' is a traction sheave, which, for example, may be mounted to a lower surface of the hoistway 16'. This is non-limiting, and the traction sheave of the plurality of sheaves 18' may be mounted anywhere within the hoistway 16' and the plurality of sheaves 18' may include a plurality of idler sheaves and at least one traction sheave. It should be appreciated that the traction sheave may include a motor such that at least one of the plurality of sheaves 18' is a device to drive the plurality of suspension members 14' through a plurality of lengths with respect to the length between the traction sheave and the contact point of the elevator cab 12'. The idler sheaves may also be mounted at various positions in the hoistway 16' including within the example frame 20'. The idler sheaves are passive (they do not drive the plurality of suspension members 14' but rather guide or route the plurality of suspension members 14'). The plurality of suspension members 14' are coupled to the elevator cab 12' to form the contact point.

It should be appreciated that the illustrated schematics of FIGS. 1A-1B are merely examples and that the suspension members 14 routing may vary significantly or slightly from these illustrated schematics. For example, there may be several idler sheaves positioned in the hoistway 16 between the traction sheave and the contact point with the elevator cab 12.

Figure 2:
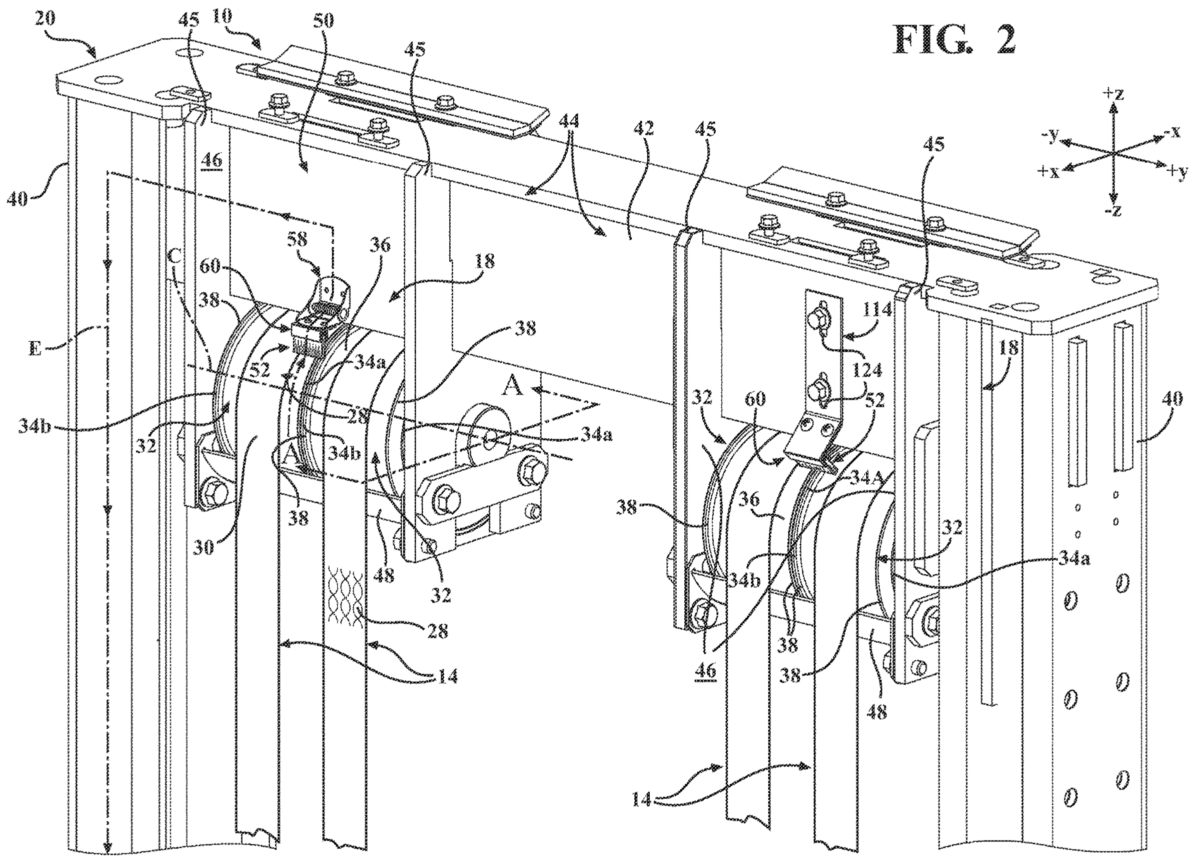
FIG. 2 schematically depicts a partial perspective view of the elevator assembly of FIG. 1A, according to one or more embodiments shown and described herein.
Figure 3:
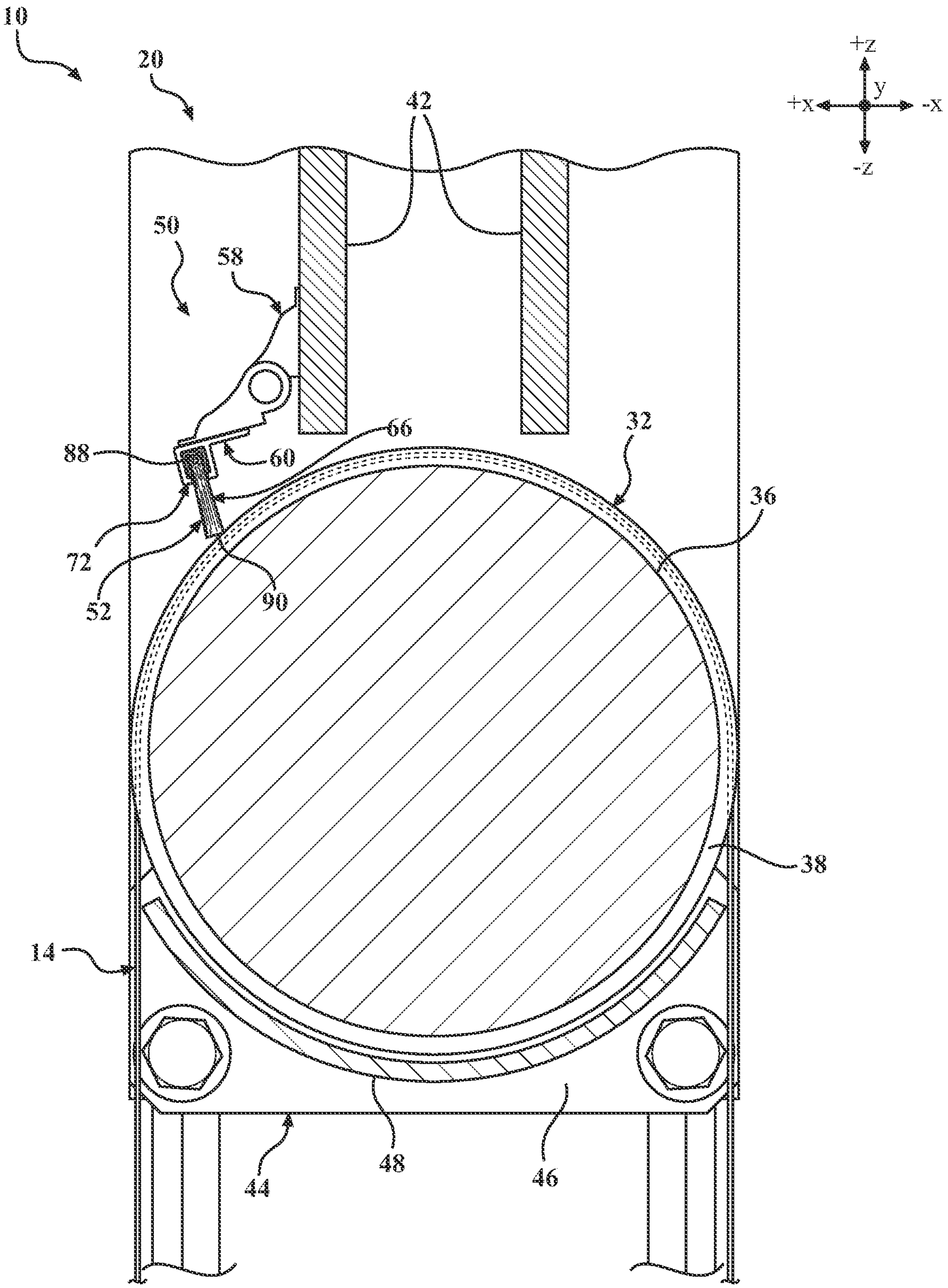
FIG. 3 schematically depicts a cross-sectional view of the elevator assembly of FIG. 2 taken along lines A-A, according to one or more embodiments shown and described herein.
Figure 4:
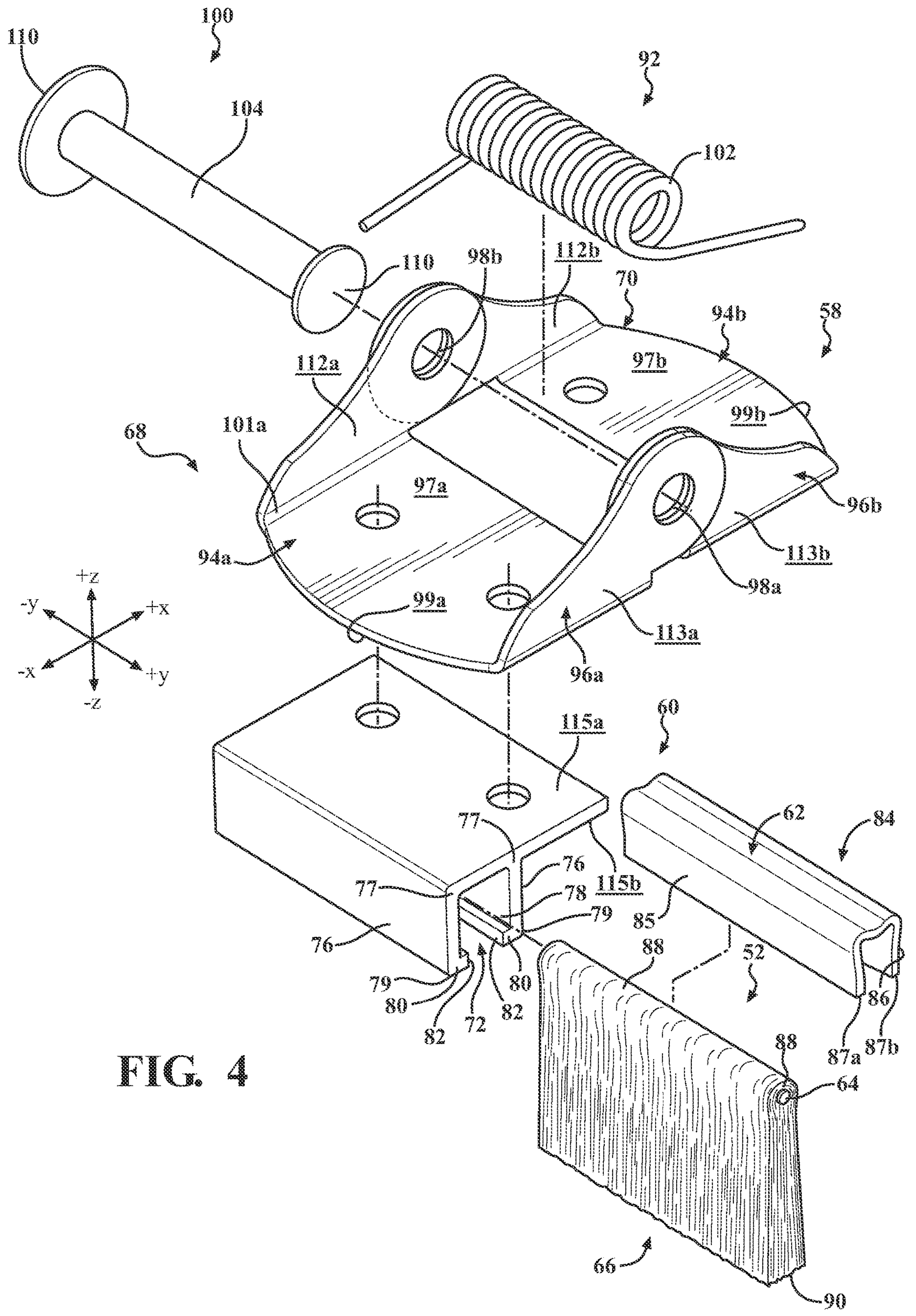
FIG. 4 schematically depicts a perspective exploded view of a first aspect of an example elevator assembly of FIG. 1A according to one or more embodiments shown and described herein.
Figure 5:
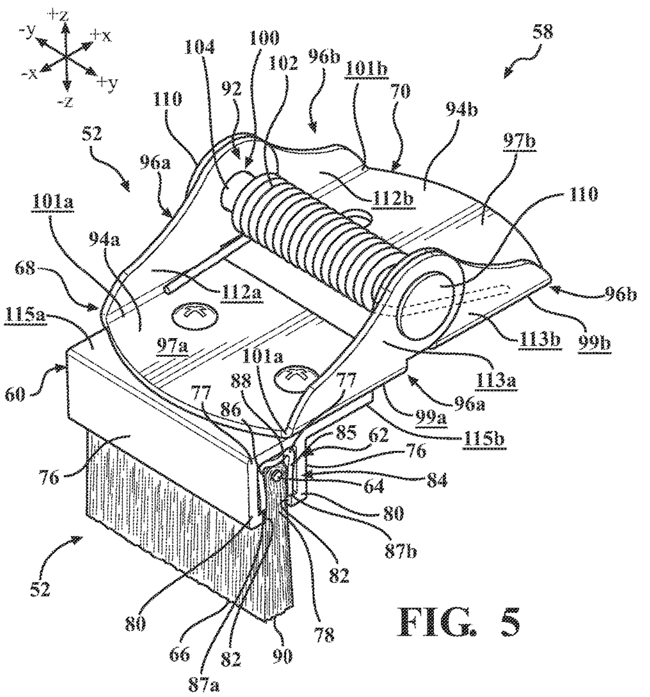
FIG. 5 schematically depicts a perspective view of the first aspect of the example electrical assembly of FIG. 4 in the assembled state, according to one or more embodiments shown and described herein.

Referring now to FIGS. 2-3 and referring back to FIG. 1A, the example frame 20 of the elevator assembly 10 may include a pair of legs 40 extending along a length of the hoistway 16 in the vertical direction (e.g., in the +/−Z direction). The pair of legs 40 are coupled to a floor of the hoistway 16 such that the example frame 20 is a fixed member within the hoistway 16. The example frame 20 may be a counterweight frame, a guide rail frame, and/or the like. Further, the example frame 20 may include additional ground wires that are connected to earth, either within the hoistway 16 or outside of the hoistway 16 such that the example frame 20 is earth grounded.

A header 42 extends between the pair of legs 40 in a direction perpendicular to the vertical direction of the pair of legs 40 such as in the lateral direction (e.g., in the +/−Y direction). A sheave bracket 44 extends from the header 42 in the vertical direction (e.g., in the +/−Z direction). The sheave bracket 44 may include a pair of spaced apart arms 45 that extend from and are coupled to the header 42. Each of the pair of spaced apart arms 45 include inner surfaces 46 that face each other. In some embodiments, a shield 48 may be coupled to and extend between the spaced apart arms 45 in the lateral direction (e.g., in the +/−Y direction). The shield may be coupled to the inner surfaces 46 via a fastener such as screws, bolts and nuts, rivets, adhesive, epoxy, weld, and/or the like. In other embodiments, a cross member may extend between the pair of spaced apart arms 45 at a distal end in the lateral direction (e.g., in the +/−Y direction). In these embodiments, the shield 48 may be coupled to the cross member between the spaced apart arms 45 in the lateral direction (e.g., in the +/−Y direction).

The plurality of suspension members 14, may be suspension belts (as depicted in the drawing figures), ropes, cables, and the like that include a plurality of conductive members. Furthermore, the plurality of sheaves 18 may be coupled to a fixed member of the hoistway 16, such as, for example, the example frame 20, a guide rail frame, and/or the like. Further, in some embodiments, the plurality of suspension members 14 may include any number of suspension members 14, such as four spaced apart suspension members, such as depicted in FIG. 2. In other embodiments, there may be more or less than four spaced apart suspension members.

Still referring to FIGS. 1A and 2-3, each of the suspension members 14 may include one or more pairs of tensile load bearing conductive members 28 and an outer jacket or sleeve 30 enclosing the one or more pair of conductive members 28. Each tensile load bearing conductive member of the one or more tensile load bearing pairs of conductive members 28 may extend along a length of the suspension members 14, extending from the proximate end 26*b* to the distal end 26*a*. Each conductive member of the one or more pairs of conductive members 28 is a load bearing tensile member disposed within the suspension member that enables the suspension members 14 to support the weight of the elevator cab 12 (FIG. 1A) and/or the plurality of weights 24 (FIG. 1A). In embodiments, each conductive member of the one or more pairs of the conductive members 28 are tensile members that may be formed of a material with a high tensile strength, such as, for example, steel that is formed into braided or twisted steel wire cables, cords, ropes, or belts, and/or the like. Other example materials may include aramid fibers, carbon fiber, other composites and/or alloys, or combinations thereof, and/or the like. The sleeve 30 may be formed of a nonconductive material (i.e., a material that does not conduct electricity), such as, for example, a polymer matrix or an outer polymer jacket of rubber, PVC and PVG, combinations thereof, similar polymers, and/or the like. As such, the suspension members 14 described herein include a plurality of internal cords or fibers, which are conductive, and are embedded within the non-conductive materials. It should be understood that the plurality of suspension members 14 described herein are not limited to any particular suspension member type or construction, and may be, or may include, ropes, cables, belts, or alternative forms and/or configuration of suspension members 14.

Each of the plurality of sheaves 18 may include a drum 32. In the embodiments illustrated and shown herein, the sheave is a dual or paired sheave in which each of the sheaves are aligned end-to-end coaxially with one another. Each drum 32 includes a first end 34*a*, an opposite second end 34*b*, a contact surface 36 therebetween, and a pair of terminating flanges 38 coupled to the first end 34*a* and the second end 34*b* respectively. This is non-limiting, and there may only be a single sheave or there may be more than two, such as a triple sheave with is arranged coaxially in the lateral direction (i.e., in the +/−Y direction).

In some embodiments, the drum 32 may be cylindrical. In other embodiments, the drum 32 may be other shapes such as an elliptical, a cylindrical defect shape, and/or the like. The contact surface 36 may extend between the first end 34*a* and the second end 34*b* around a circumference of the drum 32. One of the pair of terminating flanges 38 may be positioned at the first end 34*a* and the other one of the pair of terminating flanges 38 may be positioned at the second end 34*b* of the drum 32. The terminating flanges 38 may include a radius that is greater than a radius of the contact surface 36 of the drum 32.

Still referring to FIGS. 1A and 2-3, in the dual sheave system, such as depicted in the elevator assembly of FIG. 2, the first end 34*a* of the drum 32 may be positioned adjacent to and in contact with the second end 34*b* of the other of the drum 32. The terminating flanges 38 on the first end 34*a* of the one of the drum 32 may be in contact with the terminating flange 38 on the second end 34*b* of the other one of the drum 32. In the depicted dual sheave system, the pair of drums 32 may be arranged such that a central axis C may extend through a center of each of the drums 32 of the dual sheave system.

The sleeve 30 of the suspension members 14 may contact or ride along on a portion of the contact surface 36 of the respective sheave of the plurality of sheaves 18. The suspension members 14 may be disposed between one of the pair of terminating flanges 38 positioned on the first end 34*a* and the other one of the pair of terminating flanges 38 positioned on the second end 34*b* of the drum 32. The suspension members 14 may partially wrap around the drum 32.

Each sheave of the plurality of sheaves 18 suspended within the example frame 20 may be disposed between the pair of spaced apart arms 45 of the sheave bracket 44. Each of these particular sheaves of the plurality of sheaves 18 may be rotatably coupled to the pair of inner surfaces 46 of the pair of spaced apart arms 45 of the sheave bracket 44 such that the sheaves may rotate relative to the example frame 20. For example, fasteners such as bots and nuts, pins, screws, and/or the like may be used to couple each of these particular sheaves of the plurality of sheaves 18 to the pair of spaced apart arms 45.

The shield 48 may be positioned below these particular sheaves of the plurality of sheaves 18 in the vertical direction (e.g., in the −Z direction). The shield 48 may partially extend around the pair of sheaves 18. The shield 48 may be formed to be concentric with these particular sheaves of the plurality of sheaves 18.

In some embodiments, the elevator assembly 10 may include a number of suspension members 14 equal to the number of sheaves of the plurality of sheaves 18 within the elevator assembly 10. For example, the suspension members 14 are provided in a 1:1 ratio with the number of sheaves of the plurality of sheaves 18 provided in the example elevator assembly 10, as illustrated in FIGS. 1A-1B, and 2. In other embodiments, there may be more than one suspension member positioned to be in contact and ride on the at least one sheave of the plurality of sheaves 18. The shield 48 may be disposed between each side of the suspension members 14.

In operation, a rotation of the traction sheave type of the plurality of sheaves 18 moves the suspension members 14 through the idler type sheaves of the plurality of sheaves 18, which in turn together move the elevator cab 12 between landings. In some embodiments, the movement of the suspension members 14 is in the vertical direction (i.e., in the +/−Z direction). In other embodiments, the movement of the suspension members 14 is in the longitudinal direction (i.e., in a +/−Y direction) and/or in the lateral direction (i.e., in the X direction), or combinations thereof.

Now referring to FIGS. 2-5, the example elevator assembly 10 may further include an electrical assembly 50 and a monitoring system 54. The electrical assembly 50 may include a grounding member 52, a bracket 58, and a housing 60. In one aspect, the bracket 58 may include a first member 68, a second member 70 and a hinge member 92 that pivotally couples the first member 68 to the second member 70. The first member 68 may pivot relative to the second member 70, as discussed in greater detail herein. Each of the first member 68 and the second member 70 may include a mounting base 94*a*, 94*b* and a pair of mounting flanges 96*a*, 96*b* respectively. As such, each of the mounting bases 94*a*, 94*b* may include an exterior surface 97*a*, 97*b* and an opposite interior surface 99*a*, 99*b*.

Each of the mounting flanges 96*a*, 96*b* may extend from the exterior surface 97*a*, 97*b* respectively, such that each of the mounting flanges 96*a*, 96*b* extend from and perpendicular to the exterior surface 97*a*, 97*b*. Each of the mounting flanges 96*a*, 96*b* is positioned along opposite edges 101*a*, 101*b* of the mounting base 94*a*, 94*b*. Further, each of the mounting flanges 96*a*, 96*b* include an inner surface 112*a*, 112*b*, and an opposite outer surface 113*a*, 113*b*, respectively. The mounting flanges 96*a*, 96*b* may each include an aperture 98*a*, 98*b* respectively. Each aperture 98*a*, 98*b* may be formed to be dimensionally sized to receive a portion of the hinge member 92. In an assembled state, as best seen in FIGS. 2-3, the outer surface 113*a* of the mounting flange 96*a* is in contact with the inner surface 112*a* of the mounting flange 96*b* on one end of the bracket 58 in the assembled state and the opposite on the other end of the bracket 58 in the assembled state. That is, on the opposite end, the inverse occurs with the outer surface 113*a* of the mounting flange 96*b* is in contact with the inner surface 112*b* of the mounting flange 96*a*.

The hinge member 92 may include a pin 100 and a biasing member 102 such as a spring, lever, piston, and/or the like. The biasing member 102 may be wrapped around the pin 100 to act as a spring. In a non-limiting example, the biasing member 102 may be wrapped around the pin 100 to form a torsion spring. The torsion spring may store and release angular energy or statically couple the first member 68 and the second member 70 by deflecting energy about a centerline axis of the pin 100.

The pin 100 may include a body 104 that extends through the apertures 98*a*, 98*b* of each of the mounting flanges 96*a*, 96*b* of each of the first member 68 and the second member 70. The body 104 includes a pair of terminating heads 110 positioned at each of end of the body 104. Each of the pair of terminating heads 110 may have a radius that is larger than a radius of the body 104 of the pin 100 and the radius of the pair of terminating heads 110 may be greater than a radius of the apertures 98*a*, 98*b* in the mounting flanges 96*a*, 96*b* of the first member 68 and the second member 70. The size of the radius of the pair of terminating heads 110 prevents the pin 100 from exiting the apertures 98*a*, 98*b*. As such, the pin 100 couples together the first member 68 and the second member 70. The first member 68 and the second member 70 may independently pivot about the pin 100.

Each of the pair of terminating heads 110 of the pin 100 may rest against or move against the outer surface 113*a*, 113*b* of the respective mounting flanges 96*a*, 96*b*. The biasing member 102 may contact the exterior surface 97*a* of the mounting base 94*a* of the first member 68 and the exterior surface 97*b* of the mounting base 94*b* of the second member 70 to bias the first member 68 pivotally in a direction away from the second member 70.

Further, the second member 70 of the bracket 58 may be fixedly coupled to the header 42 of the example frame 20 with the first member 68 extending toward the respective sheave of the plurality of sheaves 18. The second member 70 of the bracket 58 may be fixedly coupled to the header 42 of the example frame 20 via one or more fasteners, such as screws, bolt and nuts, rivets, weld, epoxy, adhesives, and/or the like. The biasing member 102 may bias the first member 68 with the grounding member 52 in a direction towards the target sheave of the plurality of sheaves 18 such that the grounding member 52 may make contact with a portion of the drum 32, such as the contact surface 36 of the drum 32, as discussed in greater detail herein.

Still referring to FIGS. 2-5, the housing 60 of the electrical assembly 50 includes an upper surface 115*a* and an opposite spaced apart lower surface 115*b* to define a thickness. The housing 60 may be coupled to the interior surface 99*a* of the mounting base 94*a* of the first member 68 of the bracket 58 via the upper surface 115*a* of the housing 60. The housing 60 may be coupled to the interior surface 99*a* of the mounting base 94*a* via at least one fastener such as screw, bolt and nut, rivet, epoxy, weld, adhesive, and/or the like.

The upper surface 115*a* of the housing 60 may be coupled to the bracket 58 with the housing 60 extending in a direction away from the exterior surface 97*a* of mounting base 94*a*. The housing 60 extends in a direction way from the second member 70. In some embodiments, the housing 60 may generally be a rectangular shape extending a width of the mounting base 94*a* of the first member 68 of the bracket 58. In other embodiments, the housing 60 may be rectangular, hexagonal, octagonal, and/or the like, and may not extend the entire length of the mounting base 94*a* of the first member 68.

The housing 60 may further include a pair of spaced apart sidewalls 76 that extend from the lower surface 115*b* to define a slot 78 with at least one opening 72. The slot 78 extends at least a portion of the width of the lower surface 115*b* opposite an end where the housing is coupled to the first member 68. In some embodiments, the pair of spaced apart sidewalls 76 extend the entire width of the lower surface 115*b* in the lateral direction (i.e., in the +/−Y direction) such that the at least one opening 72 is positioned at an end of the slot 78. That is, the slot 78 is defined by the pair of spaced apart sidewalls 76 on both sides and the lower surface 115*b* positioned above in the vertical direction (i.e., in the +/−Z direction). Each of the pair of spaced apart sidewalls 76 have an upper surface 77 and an opposite terminating surface 79. The upper surface 77 is positioned to couple to the lower surface 115*b*. In some embodiments, the lower surface 115*b* and the pair of spaced apart sidewalls 76 may be monolithically formed. In other embodiments, the lower surface 115*b* and the pair of spaced apart sidewalls 76 may be coupled via a fastener, such as a rivet, screw, nut and bolt, adhesive, epoxy, weld, and/or the like.

Still referring to FIGS. 2-5, each of the pair of spaced apart sidewalls 76, at the terminating surface 79, may have a pair of tabs 80 extending in a direction towards one another into the slot 78. That is, the pair of tabs 80 extend in the longitudinal direction (i.e., in the +/−X direction) into the slot 78. The pair of tabs 80 may include inner surfaces 82 that face one another in the slot 78 of the housing 60.

The grounding member 52 may include a ferrule 62, an elongated member 64, and a plurality of bristles 66 maintained by the ferrule 62. The ferrule 62 may include a frame 84. The frame 84 is generally U-shaped with a first leg 85 and an opposite second leg 86. The frame 84 may be dimensioned to fit within the slot 78 of the housing 60, such that the inner surfaces 82 of the pair of tabs 80 are in contact with an edge portion 87*a*, 87*b* of the first leg 85 and the second leg 86, respectively. As such, the frame 84 is slidably engaged with the slot 78 such that the frame 84 of the ferrule 62 may be slid into and out of the slot 78 via the at least one opening 72. The frame 84 and/or the elongated member 64 of the ferrule 62 may maintain a plurality of bristles 66 between the first leg 85 and the second leg 86.

The plurality of bristles 66 of the grounding member 52 may include an attachment end 88 received by the frame 84 of the ferrule 62 and a contact end 90. The contact end 90 is positioned at the opposing end of the attachment end 88. Each of the plurality of bristles 66 may extend around the elongated member 64 such that the attachment end 88 is positioned adjacent the elongated member 64 within the frame 84 of the ferrule 62 and the contact end 90 extends outside of the frame 84. That is, the contact end 90 of the plurality of bristles 66 may extend in a direction away from the frame 84 of the ferrule 62. As such, the contact end 90 of the plurality of bristles 66 is positioned to extend in a direction away from the bracket 58 in the vertical direction (i.e., in the +/−Z direction). That is, the grounding member 52 may be arranged such that the plurality of bristles 66 extend substantially perpendicular from the mounting base 94*a* of the first member 68.

Still referring to FIGS. 2-5, the attachment end 88 and the elongated member 64 may be maintained within the ferrule 62 between the first leg 85 and the second leg 86 of the frame 84. The ferrule 62 and the housing 60 may compress or snap fit the attachment end 88 of the plurality of bristles 66 within the frame 84 to maintain the plurality of bristles 66 within the ferrule 62. The elongated member 64 may expand the attachment end 88 of the plurality of bristles 66 to increase the compression or snap fit from the frame 84 of the ferrule 62 and the housing 60 on the plurality of bristles 66.

The plurality of bristles 66 and other components of the grounding member 52 may be formed of a material that conducts electricity, such as steel, copper, aluminum, iron, graphite, and/or the like. Each of the components of the electrical assembly 50, including the grounding member 52, the bracket 58, and the housing 60 may be formed of conductive materials, but not necessarily the same conductive material. For example, and without limitation, the grounding member 52 may be one material, such as aluminum, the housing 60 may be a copper material, and the bracket 58 may be an iron material. It should be understood that the description of the grounding member 52 is non-limiting, and may include any structure capable of forming an electrical ground path from the targeted sheave of the plurality of sheaves 18 to the example frame 20. It should be appreciated that every sheave in the plurality of sheaves 18 may be the targeted sheave. As such, the targeted sheave, for discussion purposes, are the sheaves 18 illustrated in FIGS. 2 and 3.

Now referring to FIG. 2, to form the electrical ground path E, the plurality of bristles 66 of the grounding member 52 may be in physical contact with portions of the drum 32 such as portions of the contact surface 36 of the targeted sheave of the plurality of sheaves 18 to electrically couple to the targeted sheave to the example frame 20. That is, the plurality of bristles 66 of the grounding member 52 are in contact with portions of the targeted sheave to form the electrical ground path E, as best depicted in FIG. 2, from the targeted sheave of the plurality of sheaves 18, through the housing 60 and the bracket 58, and into the example frame 20 at the header 42. The electrical ground path E may pass from at least one of the conductive members 28 through the targeted sheave, at least one of the plurality of bristles 66, the housing 60, the bracket 58, and into the header 42 and through the example frame 20. The biasing force from the biasing member 102 may be adjusted such that a pressure from the bristles 66 on the traction sheave may be adjustable to ensure contact during rotation.

When the targeted sheave of the plurality of sheaves 18 rotate the suspension members 14, any portion of the plurality of conductive members 28 from the suspension members 14 making contact with the drum 32, such as the contact surface 36 of the targeted sheave of the plurality of sheaves 18, the electrical assembly 50 communicatively couples the targeted sheave to the example frame 20 via the electrical ground path E such that the any change in resistance, voltage, or current applied to the plurality of conductive members 28 would change or create an abnormality due to the electrical ground path E. Such a change or abnormality would be tracked, or sensed by the monitoring system 54. In other embodiments, the electrical ground path E may discharge built up static electricity on any component in contact with the electrical path. For example, static electricity built up on the sleeve 30 may be discharged through the example frame 20 utilizing the electrical assembly 50 and the electrical ground path E.

Referring now to FIGS. 1A and 2, the monitoring system 54 may include at least one sensor 120 and a controller 122. The at least one sensor 120 may be electrically coupled to pairs of the conductive members 28 of the suspension members 14 to send, even with the aid of a power device, voltage and detect the voltage, current and/or resistance returned through the conductive members 28. The at least one sensor 120 may be communicatively coupled to the controller 122 to send the detected or sensed voltages, current, and/or resistance values to the controller 122. The controller 122, may be an electronic control unit (ECU) or a central processing unit (CPU), having software modules that include algorithms, logic programs, and/or the like, data storage, and processing devices. The controller 122 may monitor the voltage sent and sensed through the pair of conductive members 28 by the at least one sensor 120. The controller 122 may detect changes in the voltage, current, and/or resistance that occur when the system is grounded caused from a portion of the pair of conductive members 28 are in contact with the targeted sheave of the plurality of sheaves 18. This is due to the wear on the suspension members 14.

That is, the controller 122 may detect the voltage sent through the pair of conductive members 28 detect and determine when the electrical ground path E is formed between the pair of conductive members 28 and the example frame 20 via the electrical assembly 50. When the electrical ground path E is formed between the pair of conductive members 28 and the example frame 20, the resistance, voltage and/or current value may be detected as an anomaly, such as zero. When the controller 122 detects that the pair of conductive members 28 are grounded, such as when the voltage through the conductive members 28 is zero, the controller 122 may determine that one or more conductive members 28 are extending or exposed through a break or a worn spot in the sleeve 30 of the suspension members 14 and is making contact with the targeted sheave of the plurality of sheaves 18 each time that portion of the suspension members 14 is routed through the targeted sheave or other sheaves. It should be appreciated that every sheave in the plurality of sheaves 18 may be the targeted sheave.

In response, the controller 122 may, in some embodiments, for example, send an alert to a user positioned remotely from the elevator assembly 10 notifying a user that the suspension members 14 requires maintenance. In other embodiments, the controller 122 may interrupt operation of the elevator assembly 10 to prevent additional wear on the suspension members 14, which may include additional wear on either of the sleeve 30 or the conductive members 28 disposed therein.

Figure 6:
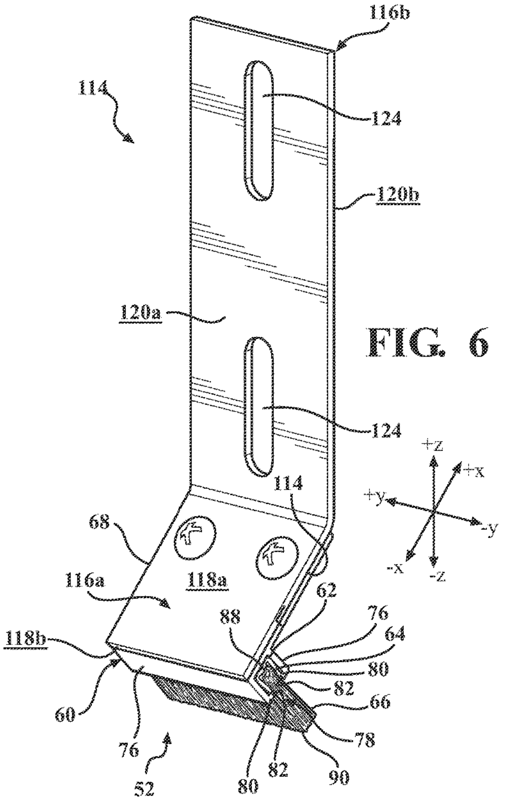
FIG. 6 schematically depicts a perspective view of a second aspect example elevator grounding device, according to one or more embodiments shown and described herein.

Referring now to FIGS. 2 and 6, a second aspect of a bracket 114 is schematically depicted. It should be understood that similar components of the bracket 114 will utilize the same numbering as with the bracket 58. The bracket 114 includes a first end portion 116*a* and an opposite second end portion 116*b*. In some embodiments, the first end portion 116*a* and the second end portion 116*b* are a monolithic structure. In other embodiments, the first end portion 116*a* and the second end portion 116*b* are fixedly coupled to one another via fasteners such as weld, epoxy, adhesive, screws, rivets, bolt and nut, and/or the like.

The first end portion 116*a* may include an exterior surface 118*a* and an opposite interior surface 118*b*. The second end portion 116*b* may include an outer surface 120*a* and an opposite inner surface 120*b*. The first end portion 116*a* may extend at an angle to the second end portion 116*b*. In some embodiments, the angle between the first end portion 116*a* and the second end portion 116*b* may be an oblique angle. In other embodiments, the angle between the first end portion 116*a* and the second end portion 116*b* may be an acute angle.

The second end portion 116*b* may be coupled to the header 42 of the example frame 20. The second end portion 116*b* may be coupled to the header 42 via a plurality of fasteners, such as screws, bolt and nuts, rivets, weld, epoxy, adhesives, and/or the like. In some embodiments, portions of the second end portion 116*b* may include slots 124 that allow for an alignment of the bracket 114 in the vertical direction (i.e., in the +/−Z direction) such that the plurality of bristles 66 may make contact with the drum 32 (FIG. 3). As such, the slots 124 are provided for the vertical adjustment of the bracket 114 via the fasteners coupling the bracket 114 to the example frame 20 (FIG. 3).

The housing 60 is coupled to and extends from the interior surface 118*b* of the first end portion 116*a*. In this configuration, the plurality of bristles 66 are in a fixed position relative to the target sheave of the plurality of sheaves 18 (FIG. 3), with a fixed pressure being provided from the bristles 66 to the target sheave. The housing 60 is coupled to the interior surface 118*b* of the first end portion 116*a* via at least one fastener such as screws, bolt and nuts, rivets, weld, epoxy, adhesives, and/or the like.

It should now be understood that described above is an electrical grounding device for an elevator assembly including an electrical assembly and a monitoring system. The electrical assembly forms an electrical ground path from a conductive member of a suspension member through a sheave to a grounded frame within the hoistway of the elevator assembly. The monitoring system may include a controller and sensors for sending and detecting a voltage through the conductive members to monitor the structural health of the suspension members. The controller may detect when the conductive members are exposed from a sleeve via a short or other abnormality in the monitoring of the conductive members. As such, the electrical assembly creates or forms an electrical ground path from the sheave to the grounded frame such that any contact by the conductive members through the electrical ground path may be monitored.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electrical assembly for grounding an elevator assembly, the elevator assembly having an elevator cab, a grounded fixed member, at least one sheave, and at least one suspension member having one or more conductive members and a sleeve enclosing the one or more conductive members, the at least one suspension member extending around the at least one sheave to support the elevator cab, the electrical assembly comprising:

a bracket coupled to the grounded fixed member;

a grounding member coupled to the bracket, wherein the grounding member is electrically coupled to the at least one sheave such that contact with the at least one sheave forms an electrical ground path between the at least one sheave through the grounding member and the bracket, and into the grounded fixed member such that when the at least one sheave moves the at least one suspension member, any portion of the one or more conductive members from the at least one suspension member making contact with the at least one sheave grounds the at least one sheave to the grounded fixed member via the electrical ground path; and a monitoring system having at least one sensor and a controller, the at least one sensor is coupled to the one or more conductive members to send and detect a voltage through the one or more conductive members, the controller monitors the voltage sent and detected through the one or more conductive members by the at least one sensor to detect when the electrical ground path is formed between the one or more conductive members and the grounded fixed member.

2. The electrical assembly of claim 1, wherein the grounding member includes a plurality of bristles.

3. The electrical assembly of claim 2, wherein at least one of the plurality of bristles is in physical contact with the at least one sheave to form the electrical ground path between the at least one sheave and the grounded fixed member.

4. The electrical assembly of claim 1, wherein the grounded fixed member is a counterweight frame.

5. The electrical assembly of claim 4, wherein:

the bracket further comprises:

a first member; and a second member positioned opposite of the first member and coupled to the first member, a housing coupled to the grounding member, wherein the second member is coupled to the grounded fixed member and the first member is coupled to the housing of the grounding member.

6. The electrical assembly of claim 5, wherein the second member is pivotally coupled to the first member.

7. The electrical assembly of claim 6, wherein the bracket further comprises:

a biasing member positioned between and pivotally coupling the first member and the second member, the biasing member biases the first member in a direction towards the at least one sheave.

8. The electrical assembly of claim 1, wherein the bracket further comprises:

a first end portion; and a second end portion positioned opposite of the first end portion, the second end portion extends at an angle with respect to the first end portion, wherein the second end portion is fixedly coupled to the grounded fixed member and the first end portion is coupled to a housing of the grounding member.

9. The electrical assembly of claim 8, wherein the angle is an oblique angle.

10. The electrical assembly of claim 1, wherein the electrical ground path is formed when the one or more conductive members are exposed from the sleeve of the at least one suspension member.

11. An electrical assembly for grounding an elevator assembly, the elevator assembly having an elevator cab, a grounded fixed member, at least one sheave, and at least one suspension member having one or more conductive members and a sleeve enclosing the one or more conductive members, the at least one suspension member extending around the at least one sheave to support the elevator cab, the electrical assembly comprising:

a bracket having a first end portion and a second end portion positioned opposite of the first end portion, the second end portion is coupled to the grounded fixed member;

a housing coupled to the first end portion of the bracket, the housing having a slot;

a grounding member coupled to the housing and positioned within the slot, wherein the grounding member is electrically coupled to the at least one sheave such that contact with the at least one sheave forms an electrical ground path between the at least one sheave through the grounding member and the bracket, and into the grounded fixed member such that when the at least one sheave rotates the at least one suspension member, any portion of the one or more conductive members from the at least one suspension member making contact with the at least one sheave grounds the at least one sheave to the grounded fixed member via the electrical ground path; and a monitoring system having at least one sensor and a controller, the at least one sensor is coupled to the one or more conductive members to send and detect a voltage through the one or more conductive members, the controller monitors the voltage sent and detected through the one or more conductive members by the at least one sensor to detect when the electrical ground path is formed between the one or more conductive members and the grounded fixed member, the electrical ground path is formed when the one or more conductive members are exposed from the sleeve of the at least one suspension member.

12. The electrical assembly of claim 11, wherein the grounding member includes a plurality of bristles.

13. The electrical assembly of claim 12, wherein at least one of the plurality of bristles is in physical contact with the at least one sheave to form the electrical ground path between the at least one sheave and the grounded fixed member.

14. The electrical assembly of claim 13, wherein the grounded fixed member is a counterweight elevator frame.

15. The electrical assembly of claim 11, wherein the first end portion is angled with respect to the second end portion.

16. An electrical assembly for grounding an elevator assembly, the elevator assembly having an elevator cab, a grounded elevator frame, at least one sheave, and at least one suspension member having one or more conductive members and a sleeve enclosing the one or more conductive members, the at least one suspension member extending around the at least one sheave to support the elevator cab, the electrical assembly comprising:

a bracket having a first member and a second member pivotally coupled to the first member by a biasing member positioned between the first member and the second member, the biasing member biases the first member in a direction towards the at least one sheave, the second member is coupled to the grounded elevator frame;

a housing coupled to the first member of the bracket, the housing having a slot;

a grounding member coupled to the housing and positioned within the slot, wherein the grounding member is electrically coupled to the at least one sheave such that contact with the at least one sheave forms an electrical ground path between the at least one sheave through the grounding member and the bracket, and into the grounded elevator frame such that when the at least one sheave rotates the at least one suspension member, any portion of the one or more conductive members from the at least one suspension member making contact with the at least one sheave grounds the at least one sheave to the grounded elevator frame via the electrical ground path; and a monitoring system having at least one sensor and a controller, the at least one sensor is coupled to the one or more conductive members to send and detect a voltage through the one or more conductive members, the controller monitors the voltage sent and detected through the one or more conductive members by the at least one sensor to detect when the electrical ground path is formed between the one or more conductive members and the grounded elevator frame, the electrical ground path is formed when the one or more conductive members are exposed from the sleeve of the at least one suspension member.

17. The electrical assembly of claim 16, wherein at least a portion of the grounding member is in physical contact with the at least one sheave to form the electrical ground path between the at least one sheave and the grounded elevator frame.

* * * * *